US012455033B2

(12) United States Patent
Cardi et al.

(10) Patent No.: US 12,455,033 B2
(45) Date of Patent: Oct. 28, 2025

(54) CONNECTOR FOR HYDRAULIC LINES, MULTI-CONNECTOR DEVICE FOR THIS CONNECTOR AND TOOL FOR MOUNTING AND/OR DISMOUNTING THE CONNECTOR

(71) Applicant: FASTER S.R.L., Rivolta d'Adda (IT)

(72) Inventors: Massimo Cardi, Pandino (IT); Mauro Rambaldini, Cemusco Sul Naviglio (IT); Matteo Seghieri, Bergamo (IT)

(*) Notice: Subject to any disclaimer, the term of this patent is extended or adjusted under 35 U.S.C. 154(b) by 10 days.

(21) Appl. No.: 18/289,648

(22) PCT Filed: May 6, 2022

(86) PCT No.: PCT/IB2022/054197
§ 371 (c)(1),
(2) Date: Nov. 6, 2023

(87) PCT Pub. No.: WO2022/234529
PCT Pub. Date: Nov. 10, 2022

(65) Prior Publication Data
US 2024/0255086 A1    Aug. 1, 2024

(30) Foreign Application Priority Data
May 7, 2021   (IT) .................. 102021000011777

(51) Int. Cl.
*F16L 37/56*   (2006.01)
*F16L 37/23*   (2006.01)

(52) U.S. Cl.
CPC ............. *F16L 37/56* (2013.01); *F16L 37/23* (2013.01)

(58) Field of Classification Search
CPC ............ F16L 39/00; F16L 37/23; F16L 37/56
See application file for complete search history.

(56) References Cited

U.S. PATENT DOCUMENTS 2,399,515 A * 4/1946 Snyder .................. F16L 37/56
5,996,452 A 12/1999 Chiang
(Continued)

FOREIGN PATENT DOCUMENTS

DE    10230293 A1    6/2004
EP    2884146 A1    6/2015
(Continued)

OTHER PUBLICATIONS

PCT Application No. PCT/IB2022/054197, International Search Report and Written Opinion, dated Aug. 11, 2022.

*Primary Examiner* — Zachary T Dragicevich
(74) *Attorney, Agent, or Firm* — Themis Law (57) ABSTRACT

A Connector comprising at least one tubular body provided with at least one mouth suitable to be coupled with a complementary connector, wherein the tubular body is also provided with a series of radial openings which partially house a plurality of spheres arranged along a circumference of the tubular body, wherein the spheres cooperate with connection means to move in a radial direction of the tubular body between an extended position, in which they protrude towards the outside of the tubular body, and a retracted position, in which they protrude towards the inside of the tubular body, wherein a thread is formed around the tubular body or around an element integral with the tubular body, wherein the thread is open from the side opposite the mouth of the connector, so that the connector can be screwed into a corresponding threaded seat in a direction facing the side opposite the mouth. The present description also relates to a multi-connector device for this connector and a tool which serves to mount and/or remove the connector in this multi-connector device.

9 Claims, 6 Drawing Sheets (56) References Cited

U.S. PATENT DOCUMENTS

| | | | | |
|---|---|---|---|---|
| 6,324,962 B1* | 12/2001 | Majkrzak | ................ | F16L 39/00 |
| 10,253,912 B2* | 4/2019 | Danelli | ................... | F16L 37/23 |
| 2017/0307123 A1* | 10/2017 | Liu | ........................ | F16L 37/23 |
| 2019/0040986 A1* | 2/2019 | Liu | ........................ | F16L 37/23 |
| 2020/0248856 A1* | 8/2020 | Foner | ...................... | F16L 37/56 |
| 2024/0060589 A1* | 2/2024 | Anderson | ............... | F16L 37/23 |

FOREIGN PATENT DOCUMENTS

| | | | | |
|---|---|---|---|---|
| IT | MI20120429 A1 | | 9/2013 | |
| JP | 2005121198 A | * | 5/2005 | ............. F16L 37/56 |

\* cited by examiner

CONNECTOR FOR HYDRAULIC LINES, MULTI-CONNECTOR DEVICE FOR THIS CONNECTOR AND TOOL FOR MOUNTING AND/OR DISMOUNTING THE CONNECTOR

CROSS-REFERENCE TO RELATED APPLICATION

This application is a national stage application under 35 U.S.C. § 371 of PCT Application No. PCT/IB2022/054197, filed 6 May 2022, which claims the priority benefit of Italian Patent Application No. 102021000011777, filed 7 May 2021, each of which is incorporated by reference herein in its entirety.

TECHNICAL FIELD

The present description relates to a connector for hydraulic lines, in particular for multi-connector devices which can be fixed to vehicles, such as agricultural machines. The present description also relates to a multi-connector device for this connector and a tool which serves to mount and/or remove the connector in this multi-connector device.

BACKGROUND OF THE DESCRIPTION

EP 2884146 discloses a multi-connector device comprising a main body provided with seats which completely house female connectors with a flat-faced mouth accessible from a coupling side of this main body. The coupling side of the multi-connector device, the mouth of the connectors and the relative disconnection means form a substantially flat surface and do not allow to act on the connectors from the coupling side, so that the connectors are inserted into the main body from the side opposite the coupling side, without the disconnection means, and blocked on this opposite side with fastening elements, after which the disconnection means are firmly fixed to the connectors in a substantially irreversible manner. However, this arrangement increases the overall dimensions of the multi-connector device and makes it more difficult to mount and above all remove the connectors, since the side opposite the coupling side is provided with hydraulic and/or electrical lines that limit accessibility to the connectors.

DE 10230293 A1 discloses a connector according to the preamble of claim 1.

SUMMARY OF THE DESCRIPTION

The object of the present description is therefore to provide a multi-connector device free from such drawbacks. Said object is achieved with a connector, a multi-connector device and a tool, the main characteristics of which are specified in the attached claims, to be considered an integral part of the present description.

Thanks to the particular threads formed around the connector and its seat in the multi-connector device, the connector does not require fastening elements that protrude from the multi-connector device and can be fixed in its seat or removed from it in a simple and fast way, especially if the particular tool according to the present description is used.

Said tool indeed exploits the movable spheres of the connector to be coupled with it and thus transmit the torque necessary to unscrew or screw the connector. With this arrangement, the tool can be coupled with the connector by penetrating its mouth, so as not to have to alter the substantially flat surface of the coupling side of the multi-connector device, especially if the connector is a female connector with a flat-face mouth and/or is provided with disconnection means arranged around this mouth.

The connector is preferably provided with a particular fitting which allows the hydraulic line between the connector and the multi-connector device to be automatically created during the mounting of the connector, especially if the multi-connector device is already prepared with a mouth complementary to the mouth of the fitting.

The tool is preferably provided with a particular collar and/or a particular axial cavity, which improve the mechanical coupling with the connector.

BRIEF DESCRIPTION OF THE DRAWINGS

Further advantages and characteristics of the connector, of the multi-connector device and of the tool will become evident to those skilled in the art from the following detailed description of some of their embodiments, to be considered non-limiting examples of the claims, with reference to the attached drawings wherein:

EXEMPLARY EMBODIMENTS

Figure 1:
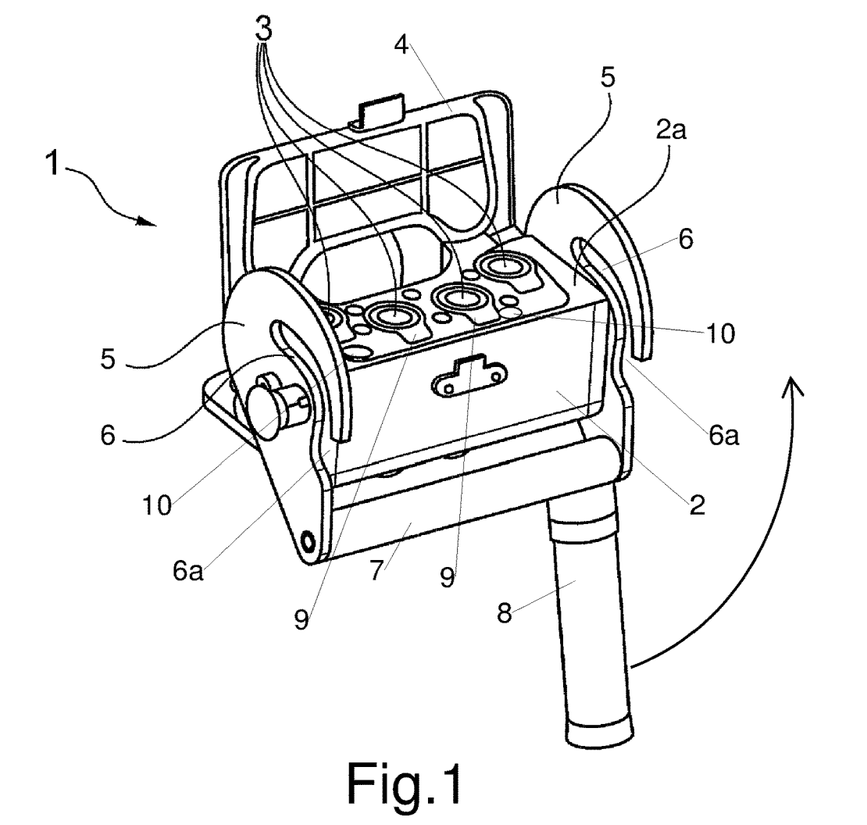
FIG. 1 shows a perspective view of an embodiment of the multi-connector device.

As shown in FIG. 1, an embodiment of the multi-connector device 1 comprises at least one main body 2 provided with one or more seats suitable for housing at least partially, in particular completely, at least one connector 3. The connectors 3 housed in the seats of the main body 2 are arranged with the longitudinal axes substantially parallel to each other and are provided with at least one opening accessible from at least one coupling side 2a (upper side in the figure) of the main body 2. The seats of the main body 2 for the connectors 3 open therefore at least towards the coupling side 2a. The coupling side 2a preferably has a surface which is substantially flat and/or substantially perpendicular to the longitudinal axes (vertical in the figure) of the connectors 3, so that the mouth of the connectors 3 is substantially flush with this surface. The main body 2 of the multi-connector device 1 can be connected in a fixed or removable way to a vehicle or another machine. When the connectors 3 are not coupled with complementary connectors, the coupling side 2a can be covered by a cover 4 which is pivoted to the main body 2. One or more cams 5 can be pivoted on one or more sides of the main body 2 and can comprise at least one eccentric groove 6 with an open end 6a. The cams 5 are connected to each other, for example by at least one bar 7 which can be provided with a handle 8, to rotate together between a locked position (shown in the figure) and an unlocked position (rotated about 90° in the direction of the arrow) of the multi-connector device 1. The main body 2 can also comprise seats for one or more disconnection means 9, in particular pushers, which can be housed in the main body 2 (as in the figure) and can extend from the coupling side 2a of the main body 2 when a connector 3 is coupled with a single complementary connector. The main body 2 can also comprise one or more cavities 10 which are open towards the coupling side 2a and extend along an axis substantially parallel to the longitudinal axes of the connectors 3.

Figure 2:
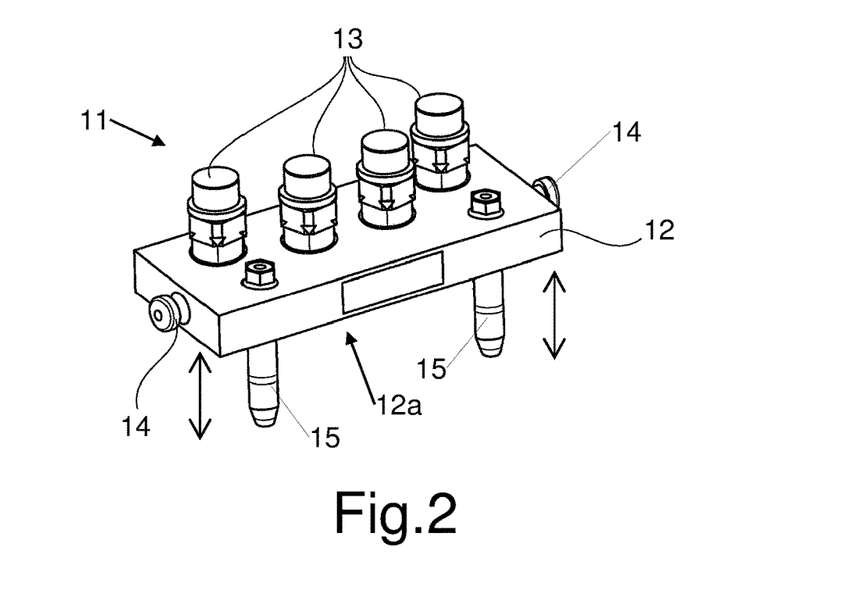
FIG. 2 shows a perspective view of a multi-connector device suitable to be coupled with the device of FIG. 1.

FIG. 2 shows a second multi-connector device 11 which is suitable to be coupled with the multi-connector device 1 and which comprises at least one main body 12 provided with one or more seats suitable for housing at least partially one or more connectors 13 complementary to the connectors 3, so that one or more pairs of connectors 3, 13 of the multi-connector devices 1, 11 can connect one or more pairs of hydraulic lines to each other. The connectors 13 are arranged with the longitudinal axes (vertical in the figure) substantially parallel to each other and can protrude from a coupling side 12a (lower side in the figure) of the main body 12. The coupling side 12a preferably has a surface which is substantially flat and/or substantially perpendicular to the longitudinal axes of the connectors 13. The main body 12 of the multi-connector device 11 can be connected in a fixed or removable way to a utility to be connected to said vehicle or machine. One or more followers 14 can protrude from one or more sides of the main body 12 to enter through the open end 6a of the eccentric grooves 6 of the cams 5 of the multi-connector device 1 and slide along these grooves, so that by rotating the handle 8 of the multi-connector device 1 from the unlocked position to the locked position, the multi-connector device 11 is pulled by the cams 5 and by the followers 14 to obtain the mutual approach of the two coupling sides 2a, 12a of the main bodies 2, 12 and then the connection of the connectors 13 of the multi-connector device 11 with the corresponding connectors 3 of the multi-connector device 1, and vice versa by rotating the handle 8 in the opposite direction. One or more pins 15 can protrude from the coupling side 12a of the main body 12 of the multi-connector device 11 to enter the cavities 10 of the main body 1 of the multi-connector device 1, so as to guide the coupling and uncoupling movements (indicated by the arrows) of the multi-connector device 11 with the multi-connector device 1.

The connectors 3 are provided with connection means necessary to allow the coupling with single connectors. In particular, at least one of the connectors 3 is a female connector with a flat-faced mouth which can be opened when the mouth of a male connector 13 is inserted into the mouth of the female connector.

Figure 3:
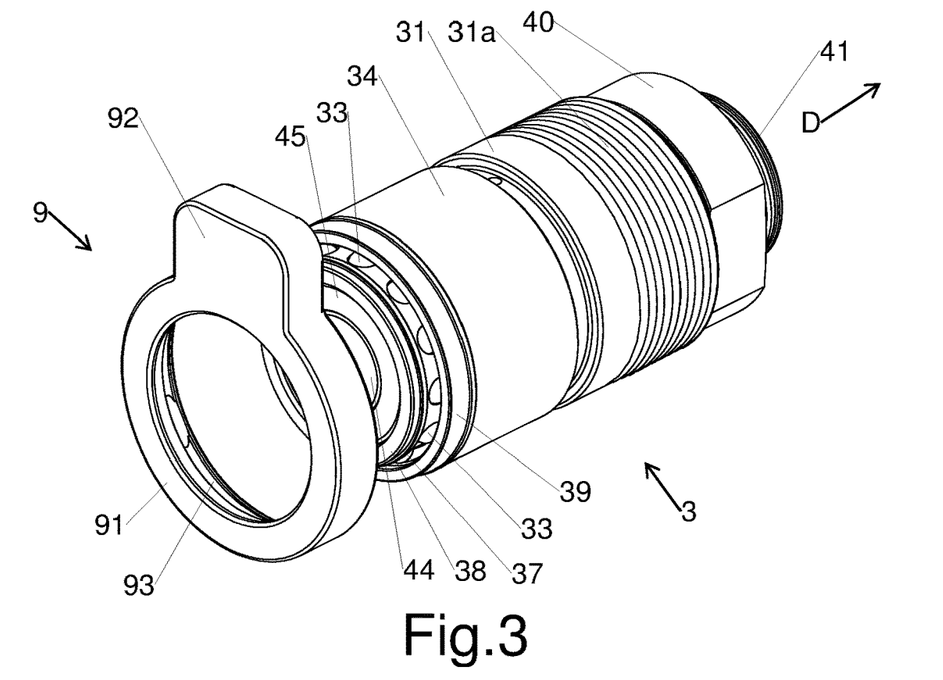
FIG. 3 shows a first exploded perspective view of a connector of the device of FIG. 1.
Figure 4:
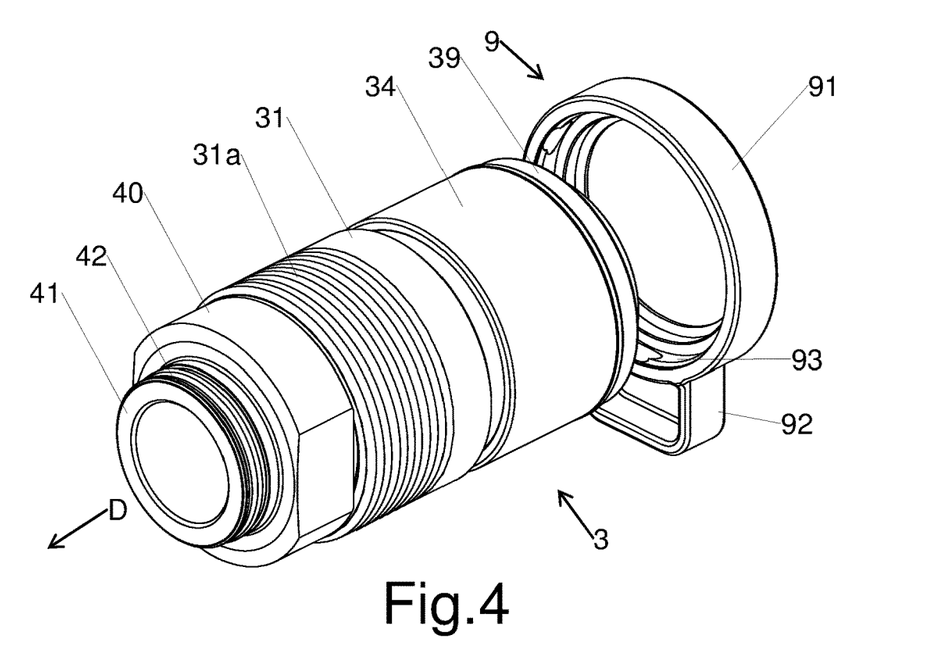
FIG. 4 shows a second exploded perspective view of a connector of the device of FIG. 1.
Figure 5:
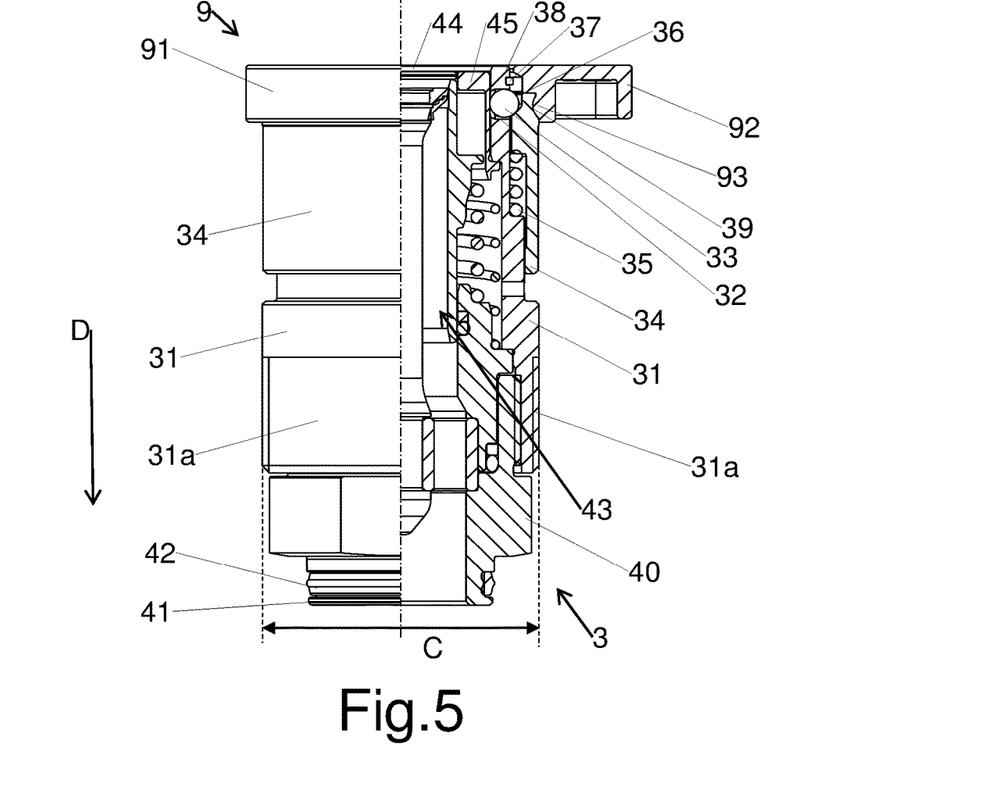
FIG. 5 shows a partially sectioned side view of the connector of FIG. 3.

As shown in FIGS. 3-5, at least one connector 3 of the multi-connector device 1 comprises at least one tubular body 31, in particular having a substantially cylindrical symmetry with respect to a longitudinal axis (vertical in FIG. 3) of the connector 3. The tubular body 31 can be formed by one or more parts joined together, in particular joined in a coaxial manner. The tubular body 31 can be provided with a series of radial openings 32 which partially house a plurality of spheres 33, for example twelve in number, arranged along a circumference of the tubular body 31. At least one ring 34, in particular having a substantially cylindrical symmetry with respect to a longitudinal axis of the connector 3, can be arranged around the tubular body 31 to cooperate with the spheres 33 and be urged axially by at least one spring 35 which acts between the ring 34 and the tubular body 31. The spheres 33 in the radial openings 32 of the tubular body 31 can move in a radial direction between an extended position (shown in the figure), in which they protrude outside the tubular body 31, and a retracted position, in which they protrude towards the inside of the tubular body 31 The radial movement of the spheres 33 in the radial openings 32 therefore depends on the position of the ring 34, and vice versa. In particular, the upper edge of the ring 34 can be freed by the movement of the spheres 33 towards the inside of the tubular body 31 or the ring 34 can allow the spheres 33 to move towards the outside of the tubular body 31 if the ring 34 is pressed against the thrust of the spring 35. The tubular body 31, the spheres 33 and the ring 34 with the spring 35 belong to connection means which allow the connector 3 to be connected and to stably hold also a single connector, i.e. a connector not mounted on a multi-connector device. At least one annular relief 37 can be arranged around the mouth 38 of the tubular body 31 to prevent the ring 34 from separating from the tubular body 31.

At least one thread 31a is formed around the tubular body 31 of the connector 3 and is open from the side opposite the mouth 38 of the connector 3, so that the connector 3 can be screwed into a corresponding threaded seat in a direction D facing the side opposite the mouth 38.

The disconnection means 9 of the connector 3 can comprise a pusher provided with an annular body 91 joined to a radial protuberance 92. The annular body 91 is joined in a rotatable manner around the ring 34, so that the disconnection means 9 are axially fastened to the ring 34 but can rotate with respect to it around its longitudinal axis. For this purpose, the annular body 91 is provided with at least one protuberance 93 arranged in at least one annular groove 39 of the ring 34, as in the present embodiment, or vice versa.

At least one fitting 40 can be joined to the tubular body 31 from the side opposite the mouth 38 of the connector 3, so that the tubular body 31 is arranged between the mouth 38 and the fitting 40. In particular, the fitting 40 is screwed by means of an external thread in a corresponding internal thread of the tubular body 31, or vice versa. The fitting 40 comprises at least one mouth 41, preferably provided with at least one annular gasket 42, suitable to be coupled with the mouth of an external duct (not shown in the figures) of a hydraulic line. The fitting 40 is entirely contained in an ideal cylinder having a diameter C equal to the external diameter of the thread 31a.

The coupling means of the connector 3 can also comprise a coupling mechanism 43, for example of a known type as in the present embodiment, which is arranged in the tubular body 31 and which helps to achieve the coupling between the connectors 3 and 13, as well as other accessory functions, such as for example opening and closing the mouth 38 by means of movable shutters 44, 45 which form the flat face of the connector 3 together with the mouth 38 and the disconnection means 9, if present.

Figures 6, 7:
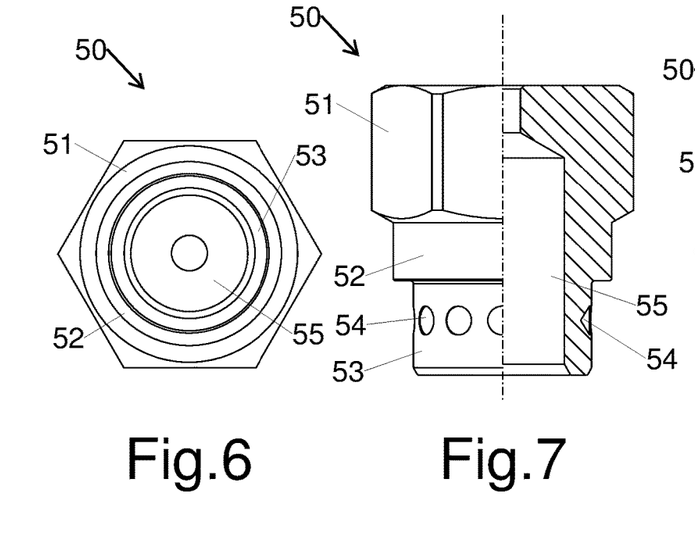
FIG. 6 shows a bottom view of an embodiment of the tool for mounting and/or removing the connector of FIG. 3.
FIG. 7 shows a partially sectioned side view of the tool of FIG. 6.
Figure 8:
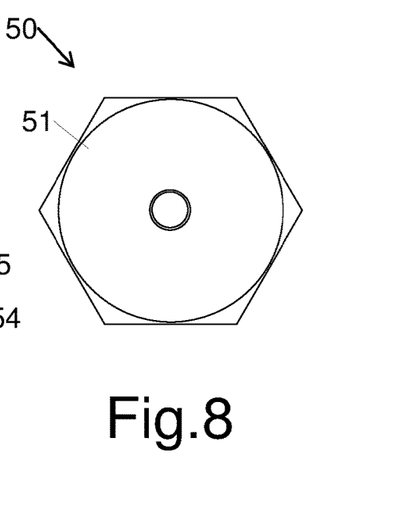
FIG. 8 shows a top view of the tool of FIG. 6.

As shown in FIGS. 6-8, an embodiment of the tool 50 comprises a head 51 suitable to be mechanically coupled with a utensil to impart a torque to the tool 50. The head 51 in particular has a prismatic shape, for example with a substantially regular hexagonal section, in order to be mechanically coupled with a torque wrench. The head 51 of the tool 50 is mechanically connected, for example by means of a collar 52, to a shank 53 substantially coaxial with the head 51 and/or with the collar 52. The shank 53 is suitable to penetrate at least partially into the mouth 38 of the connector 3 in a substantially coaxial manner with respect to the tubular body 31. The head 51, the collar 52 and the shank 53 are preferably made in a single piece, for example of metal. A plurality of radial seats 54, for example twelve in number, which are arranged along a circumference and are suitable to partially house a corresponding plurality of spheres, in particular the spheres 33 of the connector 3, are made outside the shank 53. Preferably, the collar 52 protrudes radially with respect to the shank 53 and/or the shank 53 has a substantially cylindrical shape and/or the radial seats 54 have a concave shape, for example of a spherical, cylindrical or conical cap. At least the shank 53 of the tool 50, in particular the shank 53, the collar 52 and a portion of the head 51, preferably has an axial cavity 55 suitable to house at least partially parts of the connector 3, in particular parts of the coupling mechanism 43, such as the movable shutter 44.

Figure 9:
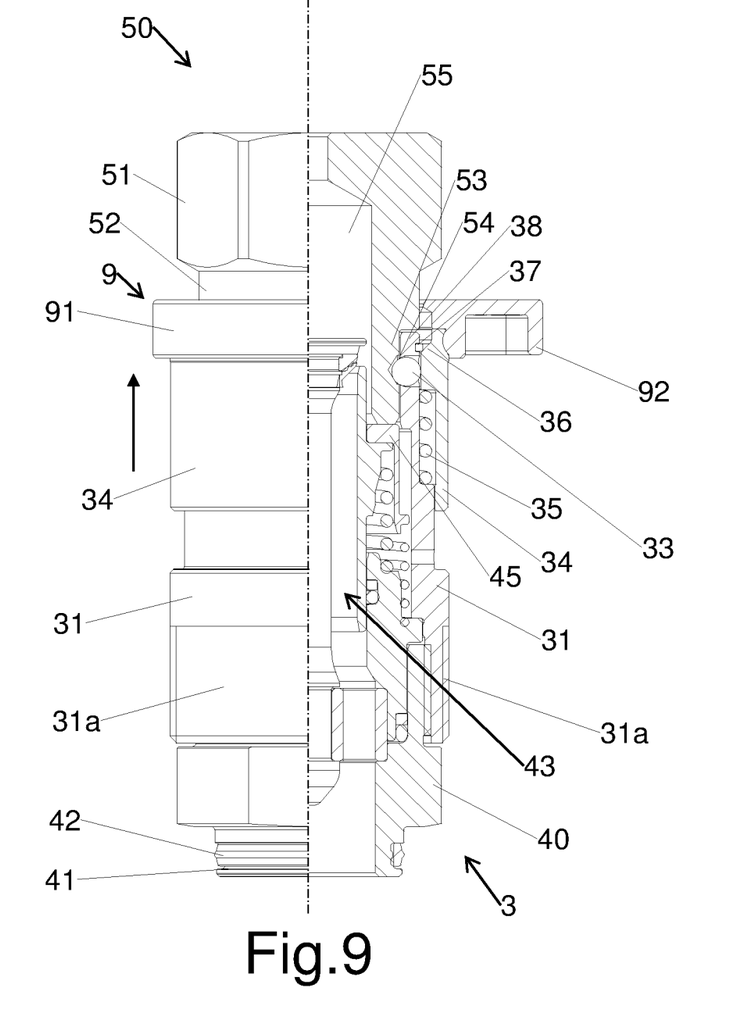
FIG. 9 shows a partially sectioned side view of the connector of FIG. 3 coupled with the tool of FIG. 6.

As shown in FIG. 9, in a first step of mounting the connector 3 into the multi-connector device 1, the shank 53 of the tool 50 is inserted into the mouth 38 of the connector 3 until the collar 52 comes into contact with the mouth 38. The distance between the collar 52 and the radial seats 54 of the shank 53 of the tool 50 is substantially equal to the distance of the spheres 33 from the mouth 38 of the connector 3, so that the spheres 33 penetrate into the radial seats 54 if they are already aligned with each other or if the tool 50 is rotated about its longitudinal axis. When the spheres 33 of the connector 3 protrude into the radial seats 54 of the tool 50, the ring 34 is released and pushed by the spring 35 towards the mouth 38 in the direction of the arrow together with the disconnection means 9, so that the tool 50 remains fixed in the connector 3, with the spheres 33 and the ring 34 preventing relative axial or rotational movements of the tool 50 with respect to the connector 3. The coupling mechanism 43 of the connector 3 is partially arranged in the axial cavity 55 of the tool 50. The free end of the stem 53 presses the movable shutter 45, moving it away from the mouth 38.

Figure 10:
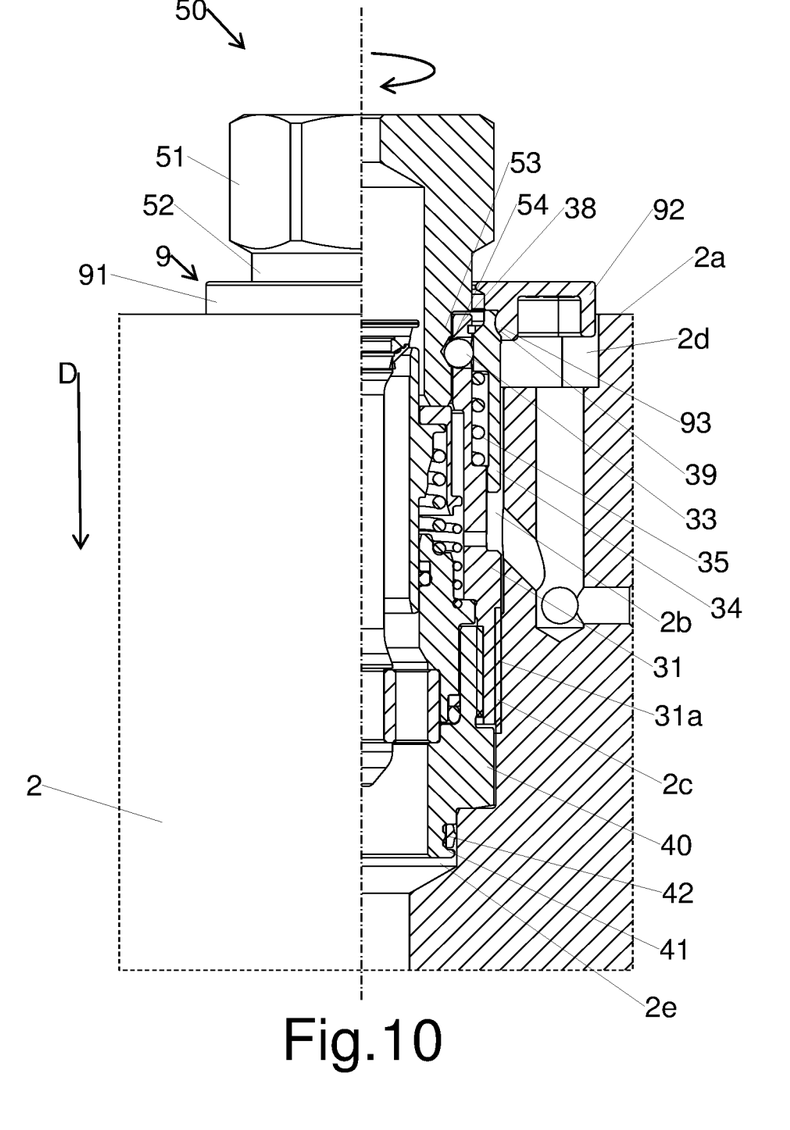
FIG. 10 shows a partially sectioned side view of the multi-connector device of FIG. 1 during the mounting of the connector of FIG. 3 with the tool of FIG. 6.

As shown in FIG. 10, in a second step of mounting the connector 3 in the multi-connector device 1, the connector 3 is inserted in the direction D from the coupling side 2a into the seat 2b of the main body 2 of the multi-connector device 1 and screwed into the seat 2b in the direction of the arrow in the figure. For this purpose, at least one seat 2b of the main body 2 is provided with a thread 2c, as in the present embodiment, or with an element with a thread, which thread is open towards the coupling side 2a and is complementary to the thread 31a of the tubular body 31 of the connector 3. During the insertion of the connector 3 in the seat 2b of the main body 2, the disconnection means 9 are joined to the connector 3 and enter at least one seat 2d which is obtained in the coupling side 2a of the main body 2 around the seat 2b for connector 3. The seat 2d for the disconnection means 9 preferably has an internal profile substantially complementary to the external profile of the disconnection means 9, so that, while the connector 3 is screwed, the ring 34 rotates with respect to the disconnection means 9, which slide axially in the seat 2d without rotating. During the insertion of the connector 3 into the seat of the main body 2, the mouth 41 of the fitting 40 is coupled with the mouth 2e of a duct which is obtained in the seat 2b of the main body 2, or is fixed to the latter, from the side opposite the coupling side 2a to create a hydraulic line with the connector 3. When the connector 3 is screwed into the seat 2b, the tool 50 can be disconnected from the connector 3 by activating the disconnection means 9, in particular by pressing the radial protuberance 92 into the seat 2d of the main body 2, so that the ring 34 is pushed towards the tubular body 31 and the spheres 33 can be radially removed from the radial seats 54 of the tool 50, by pulling the tool 50 towards the outside.

Figure 11:
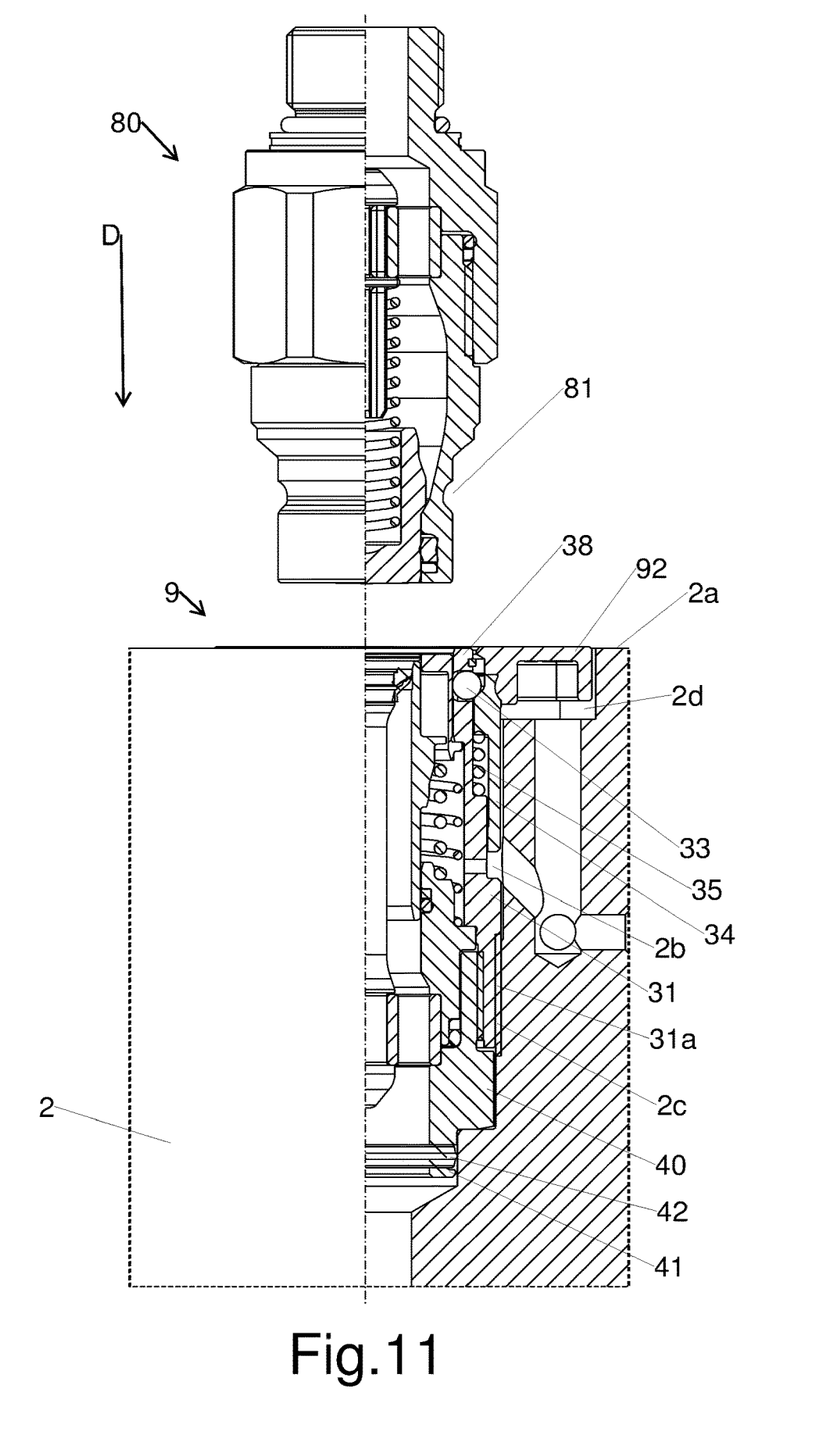
FIG. 11 shows a partially sectioned side view of the device of FIG. 1 during the coupling with a single male connector.

As shown in FIG. 11, after the connector 3 is fixed in the multi-connector device 1, a complementary connector 80, for example a single male connector according to ISO 16028, can be coupled with the connector 3 in the direction D from the coupling side 2a in the seat 2b of the main body 2, until the spheres 33 of the connector 3 snap into an annular groove 81 of the complementary connector 80, so that the latter is axially locked with respect to the connector 3 but can rotate coaxially with respect to the latter. The disconnection means 9 can then be operated to release the complementary connector 80.

When the multi-connector device 1 is instead coupled with a complementary multi-connector device, in particular the multi-connector device 11, the connectors of this multi-connector device can be without an annular groove, since the fixing between the two multi-connector devices 1, 11 is made for example by means of the cams 5 and the followers 14 or other fastening mechanisms, whereby the disconnection means 9 of the connectors 3 remain in their seats 2d of the main body 2 of the multi-connector device 1.

Variations or additions can be made by those skilled in the art to the embodiments described and illustrated here, remaining within the scope of the following claims. In particular, further embodiments may comprise the technical characteristics of one of the following claims with the addition of one or more technical characteristics described in the text or illustrated in the drawings, taken individually or in any reciprocal combination, including equivalent features thereof.

We claim:

1. A connector comprising:
   at least one tubular body provided with at least one mouth suitable to be coupled with a complementary connector,
   wherein the tubular body is also provided with a series of radial openings which partially house a plurality of spheres arranged along a circumference of the tubular body,
   wherein the spheres cooperate with connection means to move in a radial direction of the tubular body between an extended position, in which they protrude towards an outside of the tubular body, and a retracted position, in which they protrude towards an inside of the tubular body,
   wherein a thread is formed around the tubular body or around an element integral with the tubular body, wherein the thread is open from a side opposite the mouth of the connector, so that the connector can be screwed into a corresponding threaded seat in a direction facing a side opposite the mouth,
   wherein said connection means comprise at least one ring arranged around the tubular body to cooperate with the spheres and be urged axially by at least one spring which acts between the ring and the tubular body,
   wherein disconnection means are axially fastened to the ring and can rotate with respect to the ring around its longitudinal axis,
   wherein said disconnection means comprise a pusher provided with an annular body joined to a radial protuberance, wherein the annular body is joined to the ring in a rotatable manner around the ring and wherein the annular body is provided with at least one second protuberance arranged in at least one annular groove of the ring, or vice versa.

2. The connector according to claim 1, wherein the connector is a female connector with a flat-faced mouth.

3. A connector comprising:
at least one tubular body provided with at least one mouth suitable to be coupled with a complementary connector,
wherein the tubular body is also provided with a series of radial openings which partially house a plurality of spheres arranged along a circumference of the tubular body,
wherein the spheres cooperate with connection means to move in a radial direction of the tubular body between an extended position, in which they protrude towards an outside of the tubular body, and a retracted position, in which they protrude towards the inside of the tubular body,
wherein a thread is formed around the tubular body or around an element integral with the tubular body, wherein the thread is open from a side opposite the mouth of the connector, so that the connector can be screwed into a corresponding threaded seat in a direction facing a side opposite the mouth,
wherein said connection means comprise at least one ring arranged around the tubular body to cooperate with the spheres and be urged axially by at least one spring which acts between the ring and the tubular body,
wherein disconnection means are axially fastened to the ring and can rotate with respect to the ring around its longitudinal axis, and
wherein at least one fitting comprising at least one mouth of the fitting is joined to the tubular body from the side opposite the mouth of the tubular body and has an outer diameter no larger than an external diameter of the thread of the tubular body.

4. A kit comprising a connector and a tool configured to mount and/or remove the connector respectively into and/or from a multi-connector device, the kit comprising:
the connector according to claim 1; and
the tool, which comprises:
a head, which is configured to be mechanically coupled with a utensil to impart torque to the tool and which is mechanically connected to a shank, and
a plurality of radial seats defined on an outside of the shank and arranged along a circumference, the plurality of radial seats being configured to partially house said plurality of spheres of the connector, so as to couple the tool with the connector to transmit said torque to the connector.

5. The tool according to claim 4, wherein the head is mechanically connected to the shank by means of a collar which protrudes radially with respect to the shank.

6. The tool according to claim 4, wherein at least the shank has an axial cavity.

7. A multi-connector device comprising:
at least one main body provided with at least one coupling side and one or more seats at least partially housing at least one connector according to claim 1,
wherein at least one seat of the main body is provided with a thread or an element with a thread, which thread is open towards the coupling side, so that the connector can be inserted from the coupling side into the seat of the main body and screwed into this seat.

8. The multi-connector device according to claim 7, wherein the mouth of a duct is arranged in the seat for the connector on the side opposite the coupling side for making a hydraulic line with the connector arranged in this seat.

9. The multi-connector device according to claim 7, wherein at least one seat for disconnection means of the connector is formed in the coupling side of the main body around the seat for the connector.

* * * * *